United States Patent
Blum et al.

(10) Patent No.: US 6,787,581 B2
(45) Date of Patent: Sep. 7, 2004

(54) RADIO HARDENABLE POWDER PAINTS

(75) Inventors: Rainer Blum, Ludwigshafen (DE); Horst Hintze-Bruening, Münster (DE); Uwe Meisenburg, Duisburg (DE)

(73) Assignee: BASF Coatings AG, Munster (DE)

( * ) Notice: Subject to any disclaimer, the term of this patent is extended or adjusted under 35 U.S.C. 154(b) by 95 days.

(21) Appl. No.: 10/181,134

(22) PCT Filed: Jan. 23, 2001

(86) PCT No.: PCT/EP01/00706

§ 371 (c)(1),
(2), (4) Date: Oct. 22, 2002

(87) PCT Pub. No.: WO01/55268

PCT Pub. Date: Aug. 2, 2001

(65) Prior Publication Data

US 2003/0158282 A1 Aug. 21, 2003

(30) Foreign Application Priority Data

Jan. 24, 2000 (DE) .......................... 100 02 805

(51) Int. Cl.[7] .............................. B05D 1/36; B05D 7/00; C08F 2/46; C08F 2/54; C09D 167/07
(52) U.S. Cl. .................... 522/104; 522/107; 427/407.2; 427/408; 427/409; 427/487; 427/496; 427/500
(58) Field of Search ................................ 522/104, 107; 427/407.2, 408, 409, 487, 496, 500

(56) References Cited

U.S. PATENT DOCUMENTS

| | | | |
|---|---|---|---|
| 5,620,751 A | 4/1997 | Brindoepke et al. | 427/506 |
| 6,133,337 A | 10/2000 | Blum et al. | 522/104 |
| 6,541,535 B1 * | 4/2003 | Blum et al. | 522/35 |
| 6,632,481 B1 * | 10/2003 | Blum et al. | 427/496 |

FOREIGN PATENT DOCUMENTS

| | | |
|---|---|---|
| DE | 3107450 | 2/1981 |
| DE | 19600136 | 7/1997 |
| EP | 101 585 | 8/1983 |
| EP | 585 742 | 8/1993 |
| EP | 636 669 | 7/1994 |
| WO | WO86/03757 | 7/1986 |
| WO | WO97/25361 | 11/1997 |
| WO | WO99/14254 | 3/1999 |

OTHER PUBLICATIONS

English Abstract for WO97/25361 on front page of the International Publication.
English Abstract for DE3107–450, Derwent, 1982–90510, (Oct. 21, 1982).
English Abstract for DE19600136, Derwent, 1997–351973, (Jul. 10, 1997).
English Abstract for EP 101 585, Derwent, 1982–90510, (Feb. 23, 1984).

* cited by examiner

Primary Examiner—Nathan M. Nutter

(57) ABSTRACT

The invention relates to powder coating material curable with high-energy radiation, comprising an unsaturated polyester resin (A) and a polymeric crosslinker (B) containing, based on the polymer main chain, terminal and/or pendant propenyl, butenyl and/or isoprenyl groups. The unsaturated polyester resin (A) and/or the polymeric crosslinker (B) comprise structural units of the general formula I and/or II. These novel powder coating materials are curable with high-energy radiation, preferably UV light, and are notable in particular for a very good viscosity stability during the preparation, in the melt, of the resins and the compounding of the coating materials, for outstanding coating properties, and for a low oxygen sensitivity on curing. The films resulting after the cure, moreover, exhibit outstanding elasticity.

18 Claims, No Drawings

RADIO HARDENABLE POWDER PAINTS

This application is a National Phase Application of Patent Application PCT/EP01/00706 filed on Jan. 23, 2001.

The invention relates to powder coating materials curable with high-energy radiation and to a method of coating substrate surfaces with such a powder coating material.

The coating of any substrates with radiation-curable powder coating materials, preferably UV-curable powder coating materials, is gaining increasingly in interest. Advantages are expected from the fact that, in contrast to systems which cure by heat alone, there is a theoretical separation of the melting process and the curing reaction.

In the practical development of such UV powder coating materials, however, a series of problems have arisen. With the majority of polymers, these problems result substantially from the impossibility of unifying the desired blocking resistance of the powders, on the one hand, and the required elasticity of the cured coating films, on the other. When the polymers which are the basis of the respective UV powder coating material are formulated to be so hard that the resulting powders are resistant to blocking, the coating films which result after curing are brittle.

The majority of known UV powder coating materials are based on polymer systems containing acrylic and/or vinylic unsaturation. A great technical problem of these systems results from the risk of premature thermally activated polymerization of the individual components during their preparation and during the process of compounding to ready-to-use coating materials, which generally takes place in a melt extruder. A particularly critical operation is the melting of the applied coatings prior to radiation crosslinking. During this operation, the desire is for temperatures as high as possible in order to achieve melt viscosities which are as low as possible. In the course of trials with known acrylically unsaturated systems it was found that, owing to this premature thermally activated polymerization, the hoped-for effect of better leveling could not be achieved.

DE-A-31 07 450 disclosed unsaturated polyesters containing oligomers of cyclopentadiene as end groups, which in the form of solutions in ethylenically unsaturated monomers can be used to produce moldings and coatings. As such ethylenically unsaturated monomers it specifies the customary copolymerizable vinyl monomers or monomer mixtures, such as styrene, vinyltoluene, divinylbenzene, diallyl phthalate, and methyl methacrylate, for example.

EP-A-0 101 585 discloses unsaturated polyester resins which are modified by adding cyclopentadiene onto the double bond of the polyester and are then dissolved in vinyl monomers.

In EP-A-0 585 742, unsaturated crystalline polyesters are combined with acrylically unsaturated polyurethane acrylates in order to increase the blocking resistance.

EP-A-0 636 669 describes powder coating mixtures comprising unsaturated polyesters or acrylically unsaturated polyacrylates with crosslinkers, especially polyurethane crosslinkers, that are functionalized with vinyl ethers, vinyl esters or (meth)acrylic esters. The examples of this document reveal only a mixture of a polyester with a vinyl ether urethane.

As a further document, WO 99/14254 describes combinations of unsaturated polyesters or unsaturated polyacrylates with crosslinkers, preferably polyurethanes, that are functionalized with a (poly)isocyanate and vinyl ethers or unsaturated alcohols.

On the basis of this prior art, an object of the present invention was to provide powder coating materials curable with high-energy radiation, preferably UV light, which have sufficient thermal stability during application, i.e., during the melting process, in combination with a sufficient blocking-resistant hardness, but which still give elastic coating films after curing.

This object has been achieved by means of powder coating materials comprising an unsaturated polyester resin (A) and a polymeric crosslinker (B) containing, based on the polymer main chain, terminal and/or pendant propenyl, butenyl and/or isoprenyl groups, said unsaturated polyester resin (A) and/or said polymeric crosslinker (B) comprising structural units of the general formula I and/or II.

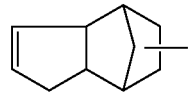

(I)

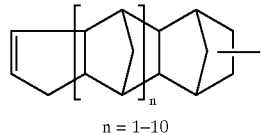

(II)

n = 1–10

The novel powder coating materials of the invention are curable with high-energy radiation, preferably UV light, and are notable in particular for a very good viscosity stability during the preparation, in the melt, of the resins and the compounding of the coating materials, for outstanding coating properties, and for a low oxygen sensitivity on curing, which takes place preferably from the melt. The films resulting after the cure, moreover, exhibit outstanding elasticity. In principle, the powder coating materials of the invention may also be cured by heat with initiators which in response to heat provide free radicals, such as peroxides, azo initiators or C—C labile compounds. Particularly worthy of mention in this context is a combination of the two cited curing methods, which has also become known by the term "dual curing". In the case of dual cure, curing is first of all carried out to a so-called B stage, i.e., a partly cured state, at which point curing is interrupted and is started again at a later point in time by another mechanism.

The novel powder coating materials of the invention are notable for improved leveling on application to the substrate that is coated. The dicyclopentadiene content of the powder coating materials results in extremely high UV reactivities. Moreover, the dicyclopentadiene-modified polyesters are formulated for a sufficient blocking-resistant hardness.

The polyester resins (A) of the powder coating materials of the invention consist of unsaturated polyester resins, known per se, containing structural units of the general formula I and/or II which are derived from dicyclopentadiene (DCPD). The polyester resins are synthesized by methods already known in the prior art, generally by polycondensation of polyfunctional hydroxyl compounds with polyfunctional acids and/or their anhydrides at relatively high temperatures.

Moreover, it is often advantageous to start from the esters of such compounds and to obtain the polyesters by transesterification at relatively high temperatures, since such transesterifications may proceed more readily and more rapidly than the direct esterification. The unsaturated nature of the polyesters comes about through the (additional) use of unsaturated compounds in the acid component and/or unsaturated alcohol components, such as alkenediols and/or oxalkylated alkenediols, for example. Preferably, unsaturated polyester resins are obtained with maleic acid and/or maleic anhydride and/or fumaric acid, since these compounds are available industrially and are inexpensive. Furthermore, polyesters containing amide structures may be obtained by the (additional) use of polyfunctional amines. The additional use of monofunctional starting materials is also possible in order, for example, to regulate the molecular weight. Below, examples are given of compounds suitable for synthesizing the polyester resins.

Examples of suitable compounds of this kind are: adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid, pyromellitic acid, ethylene glycol, polyethylene glycol, propylene glycol, polypropylene glycols, butanediol isomers, hexanediol, neopentyl glycol, trimethylolpropane, glycerol, pentaerythritol, bisphenol A, hydrogenated bisphenol A, OH-polyfunctional polymers, such as hydroxyl-modified polybutadienes or hydroxyl-bearing polyurethane prepolymers and epoxy resins, polyfunctional natural substances or derivatives thereof, such as linseed oil fatty acid, dimeric and polymeric linseed oil fatty acid, castor oil, and castor oil fatty acid. In addition to the compounds exemplified, the hydroxyl compounds specified later on below in the context of the polymeric crosslinker (B) are also suitable for synthesizing the polyesters. The introduction of amide and imide structures into polyester resins is known, for example, from DE-A-15 700 273 and DE-A-17 200 323. Such polyesteramides or polyesterimides may meet particular requirements—regarding the heat resistance, for example—in many cases more effectively than straight polyesters.

The structural units of the general formula I and/or II are in each case introduced preferably by way of adducts of dicyclopentadiene or its oligomers with α,β-unsaturated carboxylic acids or their anhydrides. Very readily available are the adducts of maleic anhydride and water with DCPD in accordance with the general formula III and/or IV

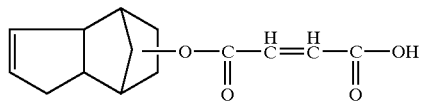

(III)

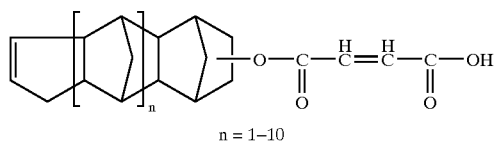

(IV)

n = 1–10

Additionally to the unsaturated polyester resin, the polymeric crosslinker (B) may comprise saturated polyesters having structural units of the general formula I and/or II. These may have been introduced, for example, by way of dihydrodicyclopentadienol in accordance with the general formula V.

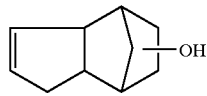

(V)

In one preferred embodiment of the powder coating materials of the invention, the crosslinker (B) comprises polymers selected from polyesters, polyurethanes and mixtures thereof. In this case it is preferred for the crosslinker to comprise terminal and/or pendant isoprenyl groups, preferably 3-methyl-3-butene.

Polyurethanes containing isoprenyl groups are obtained, for example, by the (additional) use of the commercially available isopentenols (isoprenols) 2-methyl-3-buten-2-ol, 2-methyl-2-buten-1-ol, and, preferably, 3-methyl-3-buten-1-ol. The polymer main chain of the crosslinker may be linear, branched as desired, or dentrimeric in composition. In the polymer main chain as well, purely C—C-linked compounds and compounds containing ether groups in the chain are possible. Methods of preparing 1-propenyl ethers are given, for example, by J. V. Crivello et al. in Macromolecular Engineering, Plenum Press, New York, 1995. Available commercially are propenyl ethers of polyols, such as 1,6-di(1-propenoxy)decane or tetraethylene glycol di(1-propenyl ether). Also available are isopropenylbenzyl-m-isopropyl isocyanate, 1-propenyl glycidyl ether, and isoprenol (3-methyl-3-buten-1-ol). Polyurethanes containing allyl and/or crotyl groups terminally may be converted into propenyl or butenyl groups by additionally using allyl alcohol or crotyl alcohol, respectively, with ruthenium catalysts, for example (Crivello, Pol. Mat. Sc. And Eng. 1995, Vol. 72, page 473).

Using the abovementioned isocyanates, glycidyl ethers, and isoprenol it is possible to synthesize terminally functionalized polymers. Isoprenol is preferred in this context since it brings about very good UV reactivity together with the unsaturated polyester resin (A) and is available at favorable cost commercially.

In principle, all polyurethanes and polyesters which may be prepared in accordance with the commonly known rules are suitable for synthesizing the crosslinkers (B). Preference is given to polyurethanes made from isocyanates and compounds reactive with them, such as hydroxyl compounds, or polyfunctional hydroxyl compounds, with particular preference in combination with isoprenol. Prepolymeric polyesters for synthesizing the crosslinkers (B) are obtained in principle as stated for the unsaturated polyester resins (A). The reactive termination may be achieved, for example, by the additional use of isopropenyl-benzyl-m-isopropyl isocyanate, 1-propenyl glycidyl ether, and isoprenol. Also of particular significance in connection with the synthesis of the crosslinkers (B) are oligomeric and/or polymeric substances, preferably polyhydroxyl compounds, such as polyetherpolyols, ethoxylated and/or propoxylated hydroxyl compounds, and polytetrahydrofurans, for example. The additional use of polyesterpolyols, e.g., those of the polycaprolactone type, result in coatings of particularly good weathering stability, flexibility, adhesion, chemical resistance, and high yellowing resistance. Also of significance are cycloaliphatic and araliphatic hydroxyl compounds, such as hydrogenated bisphenol A, bisphenol A and compounds derived from bisphenol A, for example, such as bisphenol-A-dialkanols. In the context of the synthesis of the polyurethanes used for the crosslinkers (B), the additional use of melamine results in substances which crystallize particularly well and which, as trifunctional crosslinkers, give rise to highly crosslinked coatings having particularly good mechanical properties, such as scratch resistance and abrasion resistance.

Suitable isocyanates for synthesizing the polymeric crosslinkers (B) with the (additional) use of polyurethanes are all known substances containing on average more than one isocyanate group, examples being aliphatic, cycloaliphatic and/or aromatic isocyanates. Also of particular interest are polymerized isocyanates, based for example on hexamethylene diisocyanate or isophorone diisocyanate. Here again, the selection may be made in accordance with criteria known to the skilled worker in the field of urethanes. For example, aliphatic and/or cycloaliphatic isocyanates, such as hexamethylene diisocyanate or isophorone diisocyanate (IPDI), result in particularly weathering-resistant, yellowing-free and chemical-resistant coatings, whereas aromatic isocyanates, such as 4,4'-methylenedi(phenyl isocyanate) (MDI) and toluene diisocyanate (TDI), give coatings which have particularly good mechanical properties but which tend to yellow under the effect of light. A further selection criterion is the price. For coatings where the color is not important, for example, the cheaper MDI may be preferred over the more expensive IPDI.

By way of the structure of the crosslinkers (B) it is possible within a wide range to determine the end properties of the cured coatings. Linear crosslinkers with only terminal and no pendant reactive groups result in a relatively wide-meshed crosslinking with a relatively large network are length and relatively high flexibility of the cured compositions. Highly branched crosslinkers and/or those with a high degree of pendant functionalization give high crosslinking densities and hard or else brittle coatings. The hardness or flexibility depends, of course, not only on the nature of the crosslinker (B) but also on the structure of the unsaturated polyester resin (A).

The special measures required for the synthesis of the unsaturated polyesters (A) of the powder coatings of the invention, with regard to the requirements relating, for example, to the hardness, elasticity, viscosity, and softening point, are taken in accordance with rules known to the skilled worker. For example, the elasticity of the cured polyester resins may be varied through the chain length of the polycarboxylic acids or polyols used. Polyester resins synthesized with ethylene glycol, butanediol, hexanediol or adipic acid have a greater flexibility than, say, those based on neopentyl glycol or phthalic acid. Moreover, the properties of the unsaturated polyesters (A) may be controlled through the additional use of polyfunctional compounds, which generate branches in the polyester molecules. Examples of such polyfunctional compounds are trimellitic acid or trimethylolpropane.

In one preferred embodiment, the unsaturated polyesters (A) and/or the crosslinker (B) are made crystalline or partially crystalline, since when this is the case the resulting polymers are generally blocking resistant even at low molecular weight, and such polymers give rise to low-viscosity melts and coatings with particularly good leveling. The rules in accordance with which crystallinity may be brought about in polymers are known per se to the skilled worker. Crystallinity or partial crystallinity may be produced in polyurethanes or polyesters, for example, by additionally using linear compounds having an even number of carbons, such as glycol, butanediol, hexanediol, hexamethylene diisocyanate.

The molecular weight distribution as well influences the blocking resistance and melt viscosity. A narrow molecular weight distribution is favorable in the range of low molecular weights, i.e., in the oligomer range, where a distribution from 500 to 5000 is typical. Suitable measures for adjusting the molecular weight and establishing a desired molecular weight distribution in unsaturated polyester resins and polyurethanes are known per se. The unsaturated polyesters (A) and/or the polymeric crosslinker (B) may, however, also be amorphous. In that case they are preferably selected in each case so as to have a Tg>50° C., with particular preference >80° C.

Where crystalline and amorphous compounds are combined, it is possible, for example, for the polymeric crosslinker to be crystalline and to have a low molecular weight, so that it polymerizes even at a low melting point. As unsaturated polyesters (A), amorphous compounds with a high Tg, as already mentioned earlier on above, are suitable in that case.

By this combination as well it is possible to prepare powder coating materials having a sufficient blocking-resistant hardness.

The powder coating materials of the invention may further comprise additives selected from curing accelerators, photoinitiators, light stabilizers, pigments, fillers, compounds which when exposed to heat form free radicals, further customary additives, and any desired mixtures thereof. Suitable photoinitiators include known, commercially customary compounds; preferably, the photoinitiators used have a low volatility at the melting temperature of the coating materials. Given an appropriate selection of photoinitiator it is also possible to obtain pigmented TV coating materials. A particularly high UV reactivity is displayed by those compounds which have H-acceptor groups attached chemically to the polyester (A) and/or the crosslinker (B). Compounds of this kind may be obtained by the additional use of reactive phenone compounds, such as hydroxybenzophenone, bishydroxybenzophenone or benzophenonecarboxylic acids and/or their anhydrides.

The invention also relates to a method of coating substrate surfaces with the powder coating material of the invention. Said method comprises applying the powder coating material to the substrate, melting it thereon by application of heat, preferably by exposure to NIR light, and then curing it in the melt, in the course of cooling or after cooling, by exposing it to high-energy radiation.

Suitable substrates include a very wide variety of materials, such as wood, plastics, woodbase materials, metal, stone, and precoated substrates.

The method of the invention may be modified such that the substrate surface is coated with the powder coating material of the invention which comprises compounds which on exposure to heat form free radicals, curing being brought about with a combination of heat and high-energy radiation. By this means in particular it is possible to carry out a two-stage cure which, as already mentioned earlier on above, is known by the term "dual curing". In this case, for example, thermal curing is carried out first of all, as a result of which the applied powder coating material on the substrate is crosslinked to a part-cured state, before being caused to cure fully at a later point in time by curing with high-energy radiation. If desired, the method may also be carried out in reverse order, with partial crosslinking with high-energy radiation being carried out first before the powder coating material is cured to completion, subsequently, by heat. Besides thermal curing, any other curing mechanisms may be combined with the curing by means of high-energy radiation.

In the text below, the invention will be illustrated with reference to implementation examples.

EXAMPLES

Compound I (Monocarboxylic Acid of Formula III)

A stirring flask with heating and reflux condenser is charged with

| 710.81 g | of 93% dicyclopentadiene | (5.0 mol) |
| 490.30 g | of maleic anhydride | (5.0 mol). |

The mixture is heated to 125° C. under a gentle stream of nitrogen and then

| 95.00 g | of water | (5.0 mol + g) | are added from a dropping funnel over the course of one hour and the mixture is left to react at 125° C. for one hour. A monocarboxylic acid of formula V is formed.

Example 1
Polyester (A)

A stirring flask with heating and top-mounted distillation unit is charged with

| | | |
|---|---|---|
| 1033.60 g | of compound 1 | (4.0 mol) |
| 235.20 g | of maleic anhydridyl ether | (2.4 mol) |
| 278.40 g | of fumaric acid | (2.4 mol) |
| 1344.00 g | of dicyclohexanolpropane | (5.6 mol) |
| 630.00 g | of polyol TP 70 | (1.4 mol) |
| 4.00 g | of Fascat 420 1 (esterification catalyst) | |
| 0.50 g | of hydroquinone. | |

The mixture is heated rapidly to 130° C. under a gentle stream of nitrogen. Then the temperature is raised gradually to 190° C. over the course of 4½ hours, during which the water of condensation which forms is removed by distillation. The resulting resin melt is poured out onto aluminum foil, and solidifies on cooling. The polyester has an acid number of 12 and a viscosity of 48 Pas/130° C. and 31 Pas/140° C. It is readily grindable, and the powders are blocking resistant.

Example 2
Isoprenol-terminated Crosslinker (B) with Copolymerically Attached Photoinitiator A stirring flask with heating and reflux condenser is charged with 1000 g of ethyl acetate 123.84 g of hexamethylene diisocyanate 32.00 g of tolylene diisocyanate 0.30 g of hydroquinone monomethyl ether and at about 60° C.

27.00 g of 1,4-butanediol 11.80 g of trimethylolpropane 39.60 g of 4-hydroxybenzophenone 68.90 g of isoprenol (3-methylbut-3-en-1-ol)

are run in together over the course of 40 minutes. Stirring is continued at about 60° C. for 2 hours, after which the mixture is cooled and the precipitate formed is filtered off and dried. This gives 285 g of a white powder having a softening range of from 82 to 97° C. and a viscosity of 1077 mPas at 130° C.

Example 3
Isoprenol-terminated Crosslinker (B)

A stirring flask with heating and reflux condenser is charged with 1000 g of ethyl acetate 123.84 g of hexamethylene diisocyanate 32.00 g of tolylene diisocyanate 0.30 g of hydroquinone monomethyl ether and at about 60° C.

36.00 g of 1,4-butanediol 11.80 g of trimethylolpropane 68.90 g of isoprenol (3-methylbut-3-en-1-ol)

are run in together over the course of 40 minutes. Stirring is continued at about 60° C. for 2 hours, after which the mixture is cooled and the precipitate formed is filtered off and dried. This gives 237 g of a white powder having a softening range of from 75 to 86° C. and a viscosity of 658 mPas at 130° C.

Example 4
Isoprenol-terminated Crosslinker (B) with Polycaprolactone

A stirring flask with heating and reflux condenser is charged with 1000 g of ethyl acetate 123.84 g of hexamethylene diisocyanate 32.00 g of tolylene diisocyanate 0.30 g of hydroquinone monomethyl ether and at about 60° C.

31.50 g of 1,4-butanediol 11.80 g of trimethylolpropane 23.00 g of Capa 200 (polycaprolation, Solvay)

68.90 g of isoprenol (3-methylbut-3-en-1-ol)

are run in together over the course of 40 minutes. Stirring is continued at about 60° C. for 2 hours, after which the mixture is cooled and the precipitate formed is filtered off and dried. This gives 228 g of a white powder having a softening range of from 71 to 87° C. and a viscosity of 486 mPas at 130° C.

Preparation of Powder Coating Samples

The constituents listed in table 1 are weighed out into a small stirring flask, melted at 120° C. in an oil bath under nitrogen, and mixed for 5 minutes. The melts are then poured out onto aluminum foils and left to cool. In all cases this gives hard resins, which were ground in a laboratory mill and sieved to a particle size of <40 μm. The sample with the crosslinker according to Example 4 was grindable only following the addition of a little dry ice. All of the powders, however, were blocking resistant on room temperature storage.

Comparative example with VP 1 (Alftalat VAN 1743, commercial unsaturated paint polyester without DCPD groups)

TABLE 1 powder coating materials used

| Ex. No. | Polyester (A) | Crosslinker (B) | Darocure 2954 | Characterization |
|---|---|---|---|---|
| 1. | 75 g VP1 | 25 g VB2 | — | (A) without DCPD (B) with photoinitiator groups |
| 2. | 75 g VP1 | 25 g VB2 | 3 g | |
| 3. | 75 g VP1 | 25 g VB3 | 3 g | (A) without DCPD (B) without photoinitiator groups |
| 4. | 75 g VP1 | 25 g VB4 | 3 g | (A) without DCPD (B) without photoinitiator groups with Capa |
| 5. | 75 g PA1 | 25 g VB2 | — | (A) with DCPD (B) with photoinitiator groups |
| 6. | 75 g PA1 | 25 g VB2 | 3 g | |
| 7. | 75 g PA1 | 25 g VB3 | — | (A) with DCPD (B) without photoinitiator groups |
| 8. | 75 g PA1 | 25 g VB4 | — | (A) with DCPD (B) without photoinitiator groups with Capa |

In this table:
PA1 means the unsaturated polyester (A) prepared in accordance with Example 1, and
VB2–4 mean the crosslinkers (B) prepared in each case in accordance with Examples 2–4.

1% of Modaflow (leveling assistant) and 0.5% of benzoin (devolatilizing aid) were added to all the samples.

Testing the Examples for Curability and Film Quality

The coating powders were applied through a sieve to cleaned bright metal deep-drawing panels in an amount sufficient to give, after curing, films with a thickness of approximately 65–75 μm. The tests were conducted on verified coating areas of the sample panels that were of comparable thickness. The sample panels were subjected to melting for 3 minutes on an adjustable hot plate preheated to 140° C., then the slide shutter of a preheated mercury vapor lamp (Hönle UV 400, emission maximum approximately 365 nm, energy density 38 mW/cm2) was opened for the stated time, then closed again, and the panels were removed from the hot plate. The tests were carried out following storage overnight at room temperature. The results are given in Table 2.

TABLE 2

Test results

| Ex. No. | Exposure time [s] | AC* | ESP* | PH* | CC* | Comments |
|---|---|---|---|---|---|---|
| 1. | 10 | sol.* | <0.5 | 56 | 5 | Without DCPD in (A), with photoinitiator (Fi) in (B): UV-curable with low reactivity |
|  | 20 | 5 | <0.5 | 51 | 5 |  |
|  | 60 | 10 | <0.5 | 82 | 5 |  |
| 2. | 10 | sol.* | <0.5 | 64 | 5 | Without DCPD in (A), with (Fi) in (B): and with added photoinitiator: better UV-curability |
|  | 20 | 10 | <0.5 | 78 | 5 |  |
|  | 60 | 45 | 1.5 | 138 | 5 |  |
| 3. | 10 | sol.* | <0.5 | 93 | 5 | Without DCPD in (A), no (Fi) in (B), with added Fi: UV-curable with moderate reactivity |
|  | 20 | 5 | <0.5 | 97 | 5 |  |
|  | 60 | 25 | 1.5 | 122 | 4 |  |
| 4. | 10 | 30 | 2.5 | 81 | 4 | Without DCPD in (A), no (Fi) in (B), Capa in (B) with added Fi: UV-curable with moderate reactivity, better adhesion |
|  | 20 | 60 | 3.5 | 97 | 4 |  |
|  | 60 | >100 | 2.8 | 129 | 3 |  |
| 5. | 10 | 80 | 2.8 | 193 | 4 | DCPD in (A), no (Fi) in (B): UV-curable in accordance with the invention with very high reactivity |
|  | 20 | >100 | 3.5 | 194 | 4 |  |
|  | 60 | >100 | 3.0 | 192 | 3 |  |
| 6. | 10 | >100 | 2.5 | 194 | 4 | DCPD in (A), no (Fi) in (B): with added Fi: UV-curable in accordance with the invention with very high reactivity |
|  | 20 | >100 | 2.1 | 196 | 4 |  |
|  | 60 | >100 | 3.5 | 193 | 4 |  |
| 7. | 10 | >100 | 2.2 | 193 | 4 | DCPD in (A), without (Fi) in (B): with added Fi: UV-curable in accordance with the invention with very high reactivity |
|  | 20 | >100 | 3.1 | 201 | 4 |  |
|  | 60 | >100 | 3.2 | 198 | 3 |  |
| 8. | 10 | >100 | 5.2 | 193 | 2 | DCPD in (A), without (Fi) in (B) with Capa in (B) with added Fi: UV-curable in accordance with the invention with very high reactivity, very good adhesion and elasticity |
|  | 20 | >100 | 7.1 | 201 | 0 |  |
|  | 60 | >100 | 7.2 | 198 | 0 |  |

In the table:
AC* means acetone test, double strokes until visible tracks are produced
ESP* means Erichsen slow penetration ISO 1520/DIN 53 156
PH* means pendulum hardness
CC* means cross-cut adhesion ISO 2409/DIN 5315
sol.* means resin film is completely soluble in acetone

What is claimed is:

1. A powder coating material curable with radiation, comprising
   (A) an unsaturated polyester resin, and
   (B) a polymeric crosslinker (B) containing, based on the polymer main chain, a group that is at least one of terminal and pendant, and wherein the group is at least one of a propenyl group, a butenyl group, and an isoprenyl group,
where at least one of the unsaturated polyester resin and the polymeric crosslinker comprise at least one of a structural unit of general formula I and a structural unit of general formula II

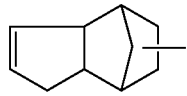

(I)

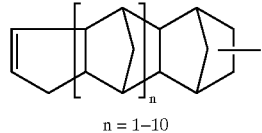

(II)

n = 1–10

2. The powder coating material of claim 1, wherein the structural units of at least one of the general formula I and the general formula II have been introduced by way of adducts of at least one of dicylopentadiene and an oligomer of dicyclopentadiene with at least one of an α,β-unsaturated carboxylic acid and an anhydride of the α,β-unsaturated carboxylic acid.

3. The powder coating material of claim 1, wherein the structural units of at least one of the general formula I and the general formula II have been introduced by way of adducts of at least one of dicyclopentadiene and an oligomer of dicyclopentadiene with maleic anhydride, wherein the adduct of dicyclopentadiene with maleic anhydride has the general formula III, and the adduct of the oligomer of dicyclopentadiene with maleic anhydride has the general formula IV

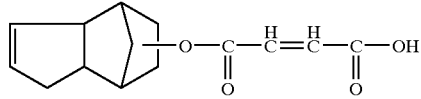

(III)

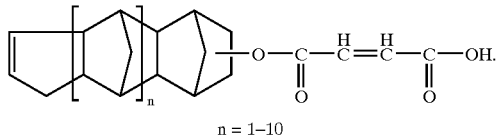

(IV)

n = 1–10

4. The powder coating material of claim 1, wherein in addition to the unsaturated polyester resin, the polymeric crosslinker (B) comprises a saturated polyester having structural units of at least one of the general formula I and the general formula II.

5. The powder coating material of claim 4, wherein the structural units of at least one of the general formula I and the general formula II have been introduced into the saturated polyester by way of a compound of the general formula V

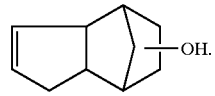

(V)

6. The powder coating material of claim 1, wherein the polymeric crosslinker (B) comprises a polymer selected from the group consisting of polyesters, polyurethanes, and mixtures thereof.

7. The powder coating material of claim 5, wherein the polymeric crosslinker (B) comprises a polymer selected from the group consisting of polyesters, polyurethanes, and mixtures thereof.

8. The powder coating material as claimed in claim 6, wherein the polymeric crosslinker (B) comprises at least one isoprenyl group, and wherein the at least one isoprenyl group is at least one of terminal and pendant.

9. The powder coating material as claimed in claim 7, wherein the polymeric crosslinker (B) comprises at least one isoprenyl group, and wherein the at least one isoprenyl group is at least one of terminal and pendant.

10. The powder coating material of claim 1 further comprises at least one of a curing accelerator, a photoinitiator, a light stabilizer, a pigment, a filler, a compound that when exposed to heat forms free radicals, and a coatings additive.

11. The powder coating material of claim 10, wherein the photoinitiator is attached chemically to at least one of the unsaturated polyester resin (A) and the polymeric crosslinker (B).

12. A method of coating a substrate surface with the powder coating material of claim 1 comprising:

(I) applying the powder coating material to the substrate, (II) melting the powder coating material thereon by application of heat, and (III) curing the melted powder coating material in the melt by exposing the melted powder coating material to UV radiation, wherein the curing is performed during one of in the course of cooling and after cooling.

13. The method of claim 12, wherein the powder coating material further comprises a compound that when exposed to heat forms free radicals, and the curing comprises a combination of heat and UV radiation.

14. The method of claim 13, wherein a photoinitiator is attached chemically to at least one of the unsaturated polyester resin (A) and the polymeric crosslinker (B).

15. The method as claimed in claim 13, wherein the curing comprises a two-stage cure in which the powder coating material is crosslinked to a part-cured state by thermal curing and at a later point in time is cured to completion with UV radiation.

16. The method as claimed in claim 14, wherein the curing comprises a two-stage cure in which the powder coating material is crosslinked to a part-cured state by thermal curing and at a later point in time is cured to completion with UV radiation.

17. The method as claimed in claim 13, wherein the curing comprises firstly partially crosslinking with UV radiation and then curing to completion by heat.

18. The method as claimed in claim 16, wherein the curing comprises firstly partially crosslinking with UV radiation and then curing to completion by heat.

* * * * *